(12) United States Patent
Shih

(10) Patent No.: US 6,406,400 B1
(45) Date of Patent: Jun. 18, 2002

(54) INTEGRATED VEHICLE MANUAL TRANSMISSION AND CLUTCH WITH PLANETARY GEAR ARRANGEMENT

(75) Inventor: Shan Shih, Troy, MI (US)

(73) Assignee: Meritor Heavy Vehicle System, LLC, Troy, MI (US)

( * ) Notice: Subject to any disclaimer, the term of this patent is extended or adjusted under 35 U.S.C. 154(b) by 0 days.

(21) Appl. No.: 09/411,735

(22) Filed: Oct. 1, 1999

(51) Int. Cl.[7] .............................................. F16H 37/02
(52) U.S. Cl. ...................... 475/207; 475/208; 475/209; 74/335; 74/336 R
(58) Field of Search ................................ 475/207, 209, 475/208; 74/335

(56) References Cited

U.S. PATENT DOCUMENTS

| | | | |
|---|---|---|---|
| 4,403,526 A | 9/1983 | Numazawa et al. | 74/740 |
| 4,462,274 A | 7/1984 | Reppert et al. | 74/781 R |
| 4,534,454 A | 8/1985 | Brooks | 192/18 A |
| 4,657,126 A | 4/1987 | Hanks et al. | 192/48.91 |
| 4,706,520 A | 11/1987 | Sivalingam | 74/781 R |
| 4,726,245 A | 2/1988 | Klaue | 74/336 R |
| 4,793,213 A | 12/1988 | Nishimura | 74/730 |
| 4,872,375 A * | 10/1989 | Trachman et al. | 74/731 |
| 4,919,010 A * | 4/1990 | Trachman et al. | 475/281 |
| 4,955,851 A * | 9/1990 | Arzoian et al. | 475/59 |
| 4,981,202 A | 1/1991 | Leigh-Monstevens et al. | 192/92 |
| 5,351,569 A | 10/1994 | Trick et al. | 74/329 |
| 5,370,014 A | 12/1994 | Pigozzi et al. | 74/331 |
| 5,390,559 A | 2/1995 | Thomas et al. | 74/325 |
| 5,458,014 A | 10/1995 | Thomas et al. | 74/325 |
| 5,526,709 A | 6/1996 | Thomas et al. | 74/325 |
| 5,564,997 A | 10/1996 | Janson et al. | 475/207 |
| 5,569,108 A | 10/1996 | Cadée et al. | 475/1 |
| 5,591,097 A | 1/1997 | Petri et al. | 475/207 |
| 5,846,153 A | 12/1998 | Matsuoka | 475/269 |
| 6,035,734 A * | 3/2000 | Le Van | 74/335 |

* cited by examiner

Primary Examiner—Charles A Marmor
Assistant Examiner—Tisha D. Lewis
(74) Attorney, Agent, or Firm—Carlson, Gaskey & Olds

(57) ABSTRACT

A vehicle transmission system includes a planetary gear arrangement that replaces the conventional clutch and range gear box. The planetary gear arrangement integrates the functions of a clutch and a range gear box while automating portions of the necessary operation of a manual transmission. The planetary gear arrangement preferably includes an automated actuator that selectively engages different portions of the planetary gear arrangement to provide at least two gear reduction ratios between an engine output member and the transmission main gear box. The automated actuator preferably moves the planetary gear arrangement between a first operative position for a first gear reduction ratio is provided, a second operative position where a second gear reduction ratio is provided and third operative position where the transmission input shaft, which preferably rotates in unison with a rotating engine output member, is uncoupled from the transmission output shaft. The first and second operative positions provide high and low range operation, respectively. The third operative position is used whenever a driver desires to shift gears or place the transmission into neutral.

19 Claims, 4 Drawing Sheets

INTEGRATED VEHICLE MANUAL TRANSMISSION AND CLUTCH WITH PLANETARY GEAR ARRANGEMENT

BACKGROUND OF THE INVENTION

This invention generally relates to vehicle transmissions. More particularly, this invention relates to a manual vehicle transmission with an automated device that functions as a combined clutch range shift gear box.

Manual vehicle transmissions are well known. Typical arrangements include a main gear box having a plurality of gear members that are selectively, manually engaged to achieve a desired gear ratio. Typical systems also include a clutch for selectively coupling a transmission input shaft to an engine output shaft. The clutch must be operated to allow a driver to shift between the various gear ratios that are available. Some systems include a range gear box that allows the main gear box members to be utilized for two sets of gear ratios; a low range and a high range.

The task of driving a vehicle having a manual transmission can prove difficult for many drivers and, in many circumstances requires highly skilled operation. In heavy vehicles, such as trucks, with a large number of available gear ratios, the driver must be able to coordinate manual shifting, manual clutch operation and manual throttle control of the engine to achieve the conditions necessary to effect efficient shifting. Various attempts have been made to simplify the task of driving vehicles with manual transmissions.

One approach has been to automate the clutch operation. An example of this approach is shown in U.S. Pat. No. 4,981,202, where an electric motor is used to open and close a clutch as needed during shifting. Another approach at simplifying the shifting operation of a manual transmission, has been to control the torque between the engine and the transmission without actuating the clutch. An example of this approach is shown is U.S. Pat. No. 5,569,115, where synchronization techniques are used to control the torque between the engine and the transmission to allow a driver to shift gears without requiring clutch operation. Another approach at simplifying the operation of a manual transmission is to provide the driver with a shift lever that generates electrical signals indicating a desired gear shift. An automated shift actuator moves the components within the transmission gear box in response to the signal generated by the driver moving the shift lever.

While the above systems each have their own advantages and benefits, those skilled in the art always strive to make improvements. Additionally, some of the proposed or current systems have certain drawbacks and shortcomings. For example, electric clutch actuators require additional components, which introduces additional cost. Further, the of electrical clutch actuators can introduce the need for further maintenance and repair.

Another aspect of simplifying the operation of a manual transmission relates to the use of a range gear box. In some circumstances, a manual operation of a range shift is required. Other proposals have included automating a range gear box under conditions where a shift between high and low ranges is required (i.e. between fifth gear and sixth gear). One example of a proposed arrangement for a hydraulically operated range gear system is shown in U.S. Pat. No. 4,403,526 where a planetary gear set is provided that operates as a range gear box.

This invention provides a significant advance compared to previous systems by integrating the function of a traditional clutch and a range gear box into a single device that operates in conjunction with the main gear box. A transmission system designed according to this invention does not include the traditional clutch and, therefore, does not require a driver to operate a clutch pedal. Further, this invention does not require any additional automated clutch operating mechanism. This invention provides manufacturing economies and enhanced vehicle performance compared to traditional arrangements.

SUMMARY OF THE INVENTION

In general terms, this invention is an integrated manual transmission system having a single device that combines the function of a traditional clutch and a range gear box. A transmission system designed according to the invention includes a main transmission gear box with a plurality of gear members that are selectively engaged to provide a plurality of gear ratios between a transmission input shaft and a transmission output shaft. The transmission input shaft preferably is directly coupled to a rotary output member on the vehicle engine such as the engine output shaft or the flywheel. A shift member allows a driver of a vehicle to manually select one of the plurality of gear ratios. A planetary gear arrangement is selectively operated to couple the transmission input shaft to the transmission output shaft such that the force from the engine output member is selectively transferred through the planetary gear arrangement and the main gear members to the transmission output shaft.

In the preferred embodiment, the planetary gear arrangement includes a sun gear, a ring gear and a plurality of pinion gears that are associated with a carrier member. The carrier member preferably is associated with the gear members in the main gear box so that torque imposed on the carrier member is transferred through the main gear box to the output shaft. Either the sun gear or the ring gear can be coupled to the transmission input shaft to rotate with the rotating engine output member. An automated engaging member, such as a wet clutch, is operated to selectively provide a first reduction ratio between the transmission input shaft and the main gear box, a second gear reduction ratio, and to effectively uncouple the transmission input shaft from the transmission output shaft to allow a shift in the main gear box.

The planetary gear arrangement replaces a conventional clutch and separate range gear box assembly. A system designed according to this invention automates a portion of the operation of a manual transmission system, which simplifies the task of driving the vehicle. Moreover, a system designed according to this invention provides enhanced drive line and vehicle performance and manufacturing advantages.

The various features and advantages of this invention will become apparent to those skilled in the art from the Detailed Description of the currently preferred embodiment. The drawing that accompany the Detailed Description can be briefly described as follows.

DETAILED DESCRIPTION OF A PREFERRED EMBODIMENT

Figure 1:
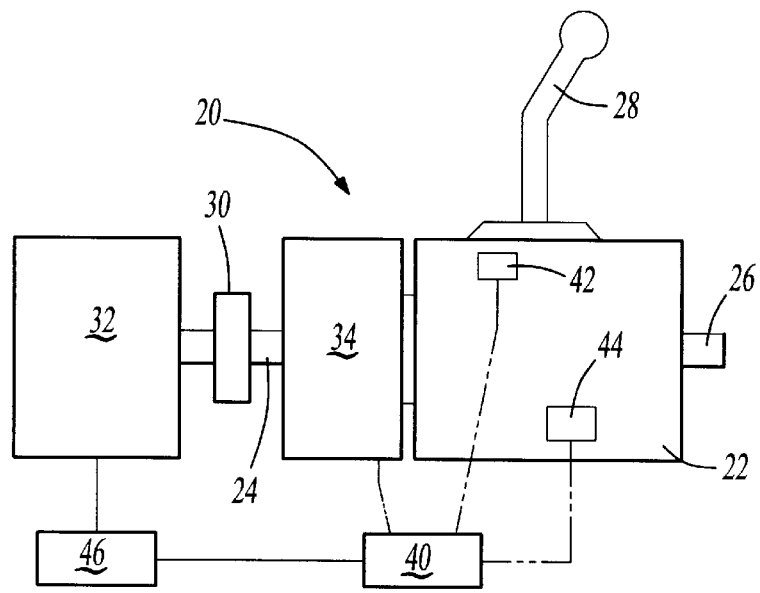
FIG. 1 schematically illustrates a vehicle transmission system designed according to this invention.

FIG. 1 schematically illustrates a vehicle transmission system 20. A main gear box 22 includes a plurality of gear members as known in the art for providing a plurality of gear ratios between a transmission input shaft 24 and a transmission output shaft 26. A shift member 28 is moveable to manually select one of the plurality of gear ratios within in main gear box 22. The shift member 28 can be a manual stick shift that allows a driver to manually engage the different gear members to achieve a desired gear ratio. Alternatively, a system designed according to this invention includes a shift member 28 that is a shift lever that is selectively moveable by a driver to generate an electrical signal that indicates a desire to shift gears.

A rotary output member 30 of an engine 32 such as a conventional output shaft and flywheel arrangement, provides a driving force (i.e., torque) to the transmission input shaft 24. In the preferred embodiment, the transmission input shaft 24 is directly coupled to the rotating engine output member 30 without using a traditional clutch.

The vehicle transmission system 20 includes a planetary gear arrangement 34 that effectively operates as a combined clutch and range gear box. As will be described in more detail below, the planetary gear arrangement 34 selectively provides two different gear reduction ratios between the transmission input shaft 24 and the gear members within the main gear box 22. The planetary gear arrangement 34 also operates to uncouple the transmission input shaft 24 from the transmission output shaft 26.

The system 20 includes an electronic controller 40, which can be realized through a conventional microcomputer, for example. The controller 40 is operative to control the planetary gear arrangement 34 to achieve the different gear reduction ratios and to uncouple the transmission input shaft 24 from the transmission output shaft 26 as will be described in more detail below.

The controller 40 preferably also communicates with a sensor arrangement 42 that indicates movement of the shift member 28. The controller preferably also communicates with a conventional sensor arrangement 44 that utilizes positions of selected components within the main gear box 22 in a known manner to indicate a currently engaged gear ratio. The information from the sensor arrangements 42 and 44 preferably is used by the controller 40 to control the operation of the planetary gear arrangement 34 so that the transmission operates as desired.

Additionally, an engine controller 46, which is known in the art, preferably communicates with the controller 40 to provide information regarding the engine speed, for example.

Figure 2:
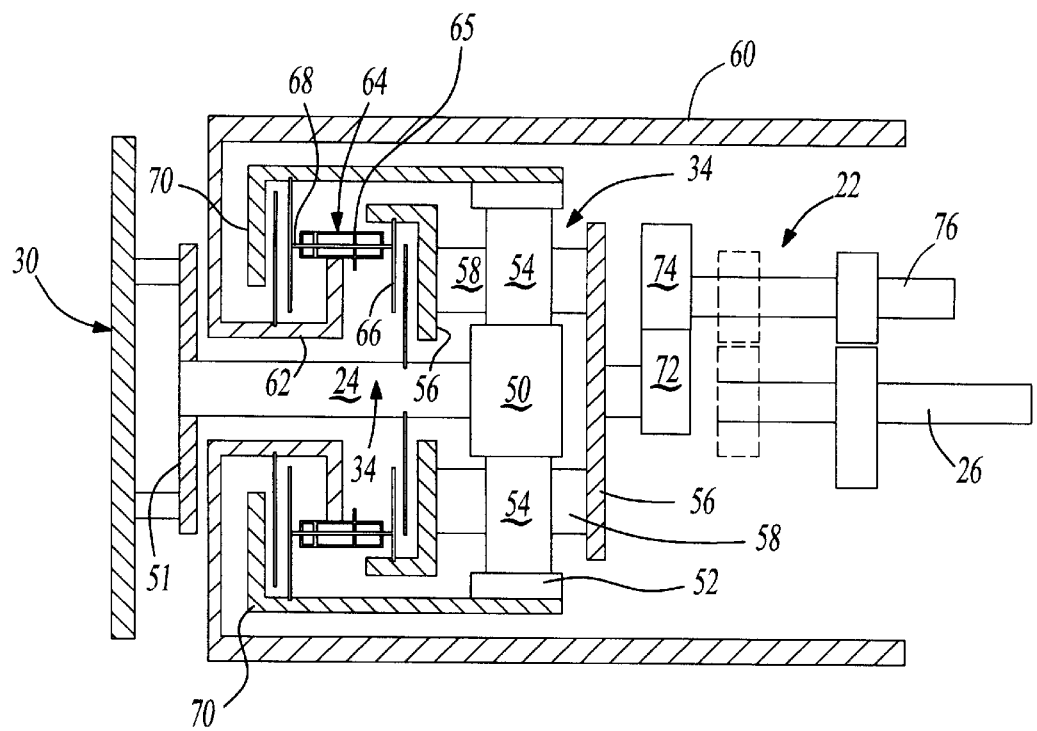
FIG. 2 schematically illustrates a first embodiment.

FIG. 2 schematically illustrates a first example of the transmission system 20 designed according to this invention. In this embodiment, the planetary gear arrangement 34 includes a sun gear 50 that is fixed to rotate with the transmission input shaft 24. A torsional damper 51 preferably is provided to couple the engine output member 30 with the transmission input shaft 24. Since the sun gear 50 rotates with the input shaft 24 in the example of FIG. 2, the sun gear 50 can be referred to as the input member of the planetary gear arrangement 34. A ring gear 52 surrounds the sun gear 50. A plurality of pinion gears 54 are intermeshed between the ring gear 52 and the sun gear 50. A carrier member 56 is associated with pinion gears 54 so that each pinion gear 54 can rotate about its own axis 58 relative to the carrier member 56 and the carrier member 56 can rotate with the pinion gear members 54 about the sun gear 50.

The system 20 preferably includes a single housing 60 that houses the main gear box 22 and the planetary gear arrangement 34. In the illustrated example, the housing 60 includes a support portion 62 that supports an automated actuator or an engaging member assembly 64. In the preferred arrangement, the automated actuator 64 includes a hydraulically actuated piston 65 for selectively moving wet clutches 66 and 68 into and out of engagement depending upon the desired operation of the transmission. Alternatives to a hydraulic actuator include pneumatic and electric powered devices. The positions of the clutches 66 and 68 in the example shown in FIG. 2 are interdependent such that when the clutch 68 is engaged, the clutch 66 is, not engaged and vice versa. The automated actuator 64 also provides a position where neither of the clutches 66 or 68 are engaged. When neither clutch is engaged, the transmission input shaft 24 is uncoupled from the output shaft 26, such that no appreciable torque is transmitted to the main gear box portion 22.

The carrier member 56 preferably is associated with a main gear box input gear 72 so that driving toque can be selectively transmitted from the engine output member 30 and transmission input shaft 24 to the gear members within the main gear box 22. Example gear members are shown such as the main gear box input gear 72 and a countershaft gear 74, which rotates with a counter shaft 76 as known in the art. The selected gear arrangement provides the desired gear ratio so that the transmission output shaft 26 drives the wheels of the vehicle as needed.

The actuator 64 preferably is automated and controlled by the electronic controller 40. It is also possible to have manual actuation, however, automated movement is preferred to simplify the task of driving the vehicle. In one example, the actuator 64 is automated and the driver can operate a clutch pedal (not illustrated) in the event manual actuation is desired.

The engagement member 64 moves the clutches 66 and 68 into different positions to provide the desired operation of the vehicle transmission system 20. Whenever the transmission should be in neutral, at vehicle start up for example, the engaging member assembly 64 does not engage either clutch 66 or 68. In this condition, the sun gear and transmission input shaft rotate at the same speed as the engine output member 30. Since the ring gear 52 and the carrier member 56 are free to rotate, no appreciable torque is transmitted from the carrier member 56 to the main gear box input gear 72. In this position, the planetary gear arrangement 34 effectively uncouples the transmission input shaft 24 from the transmission output shaft 26. This condition typically was achieved in a manual transmission by opening a clutch by manual operation of a clutch pedal, for example. With this invention, no separate clutch is required (i.e, the clutch function is integrated into the transmission system) and the driver need not be concerned with that portion of the operation of the transmission system. Of course, there may be circumstances where manual input (i.e., manual actuation) to the engaging member assembly 64 is useful and the system 20 can be designed to accommodate such circumstances.

When it is desirable to operate the vehicle transmission in a low range (i.e. first through fifth gears), the engaging member assembly 64 moves the clutch 68 into engagement.

The extension 70 on the ring gear 52 and the arrangement of the support portion 62 allows the clutch 68 to effectively ground the ring gear 52 to the housing 60. When the clutch 68 is engaged, the ring gear 52 is not permitted to rotate. In this position, a first gear reduction ratio is provided between the transmission input shaft 24 and the main gear box 22. The pinion gears 54 and the carrier member 56 rotate about the sun gear 50 and provide a first gear reduction ratio that is selected by the design of the pinion gears 54, the ring gear 52 and the sun gear 50, respectively. In one example, the first gear reduction ratio provides a torque multiplication factor of three. In this position, the transmission main gear box 22 operates in a low range.

Each time that a driver wants to make a shift in the main gear box 22, the controller 40 preferably operates the automated actuator 64 to open the clutch 68 momentarily to interrupt the torque transfer and to allow the gear members within the main gear box to be disengaged and then re-engaged into a desired gear ratio. The controller 40 preferably gathers information from the sensor arrangement 42, which indicates a movement of the shift member 28. In situations where a shift lever that generates electrical signals indicating a desired shift is present, the sensor arrangement 42 may be included as a redundancy and the controller 40 can receive and interpret the signals from the shift lever indicating a desired shift as a signal for when to move the planetary gear arrangement into the position that uncouples the transmission input shaft 24 from the output shaft 26.

Upon determining that the appropriate gear members in the main gear box 22 are engaged to achieve the desired gear ratio, the controller 40 preferably causes the automated actuator 64 to move the clutch 68 back into an engaged position so that the vehicle can be driven with the transmission in the desired gear ratio.

Once a shift from the low gear range into the high gear range is desired, (such as To shifting from fifth to sixth gear) the automated actuator 64 engages the clutch 66 rather than the clutch 68. In the illustrated embodiment, engaging the clutch 66 effectively couples the carrier member directly to the transmission input shaft 24 and the sun gear 50 so that the carrier member 56 is locked to rotate in unison with the input shaft 24. In this position, a direct drive from the engine to the main gear box input gear 72 is achieved. This provides a high range of operation because the gear members within the main gear box 22 can be used for a "second set" of high range gear ratios. Whenever a shift is desired, the automated actuator 64 momentarily opens the clutch 66 so that the gear members can be selectively moved within the main gear box 22 to achieve a desired gear ratio. The clutch 66 is then engaged to continue driving the vehicle.

Given this description, those skilled in the art will be able to choose from among available microprocessors, or to design dedicated circuitry, for example, to realize a controller 40 that operates as described in this text. Similarly, given this description, those skilled in the art will be able to program a controller to accomplish the results mentioned in this description.

FIG. 2 illustrates one example of a planetary gear set combined with a main transmission gear box. Other variations are possible where different forms of engaging members are used and different operation of the various planetary gear members are used to achieve the different gear reduction ratios.

Figure 3:
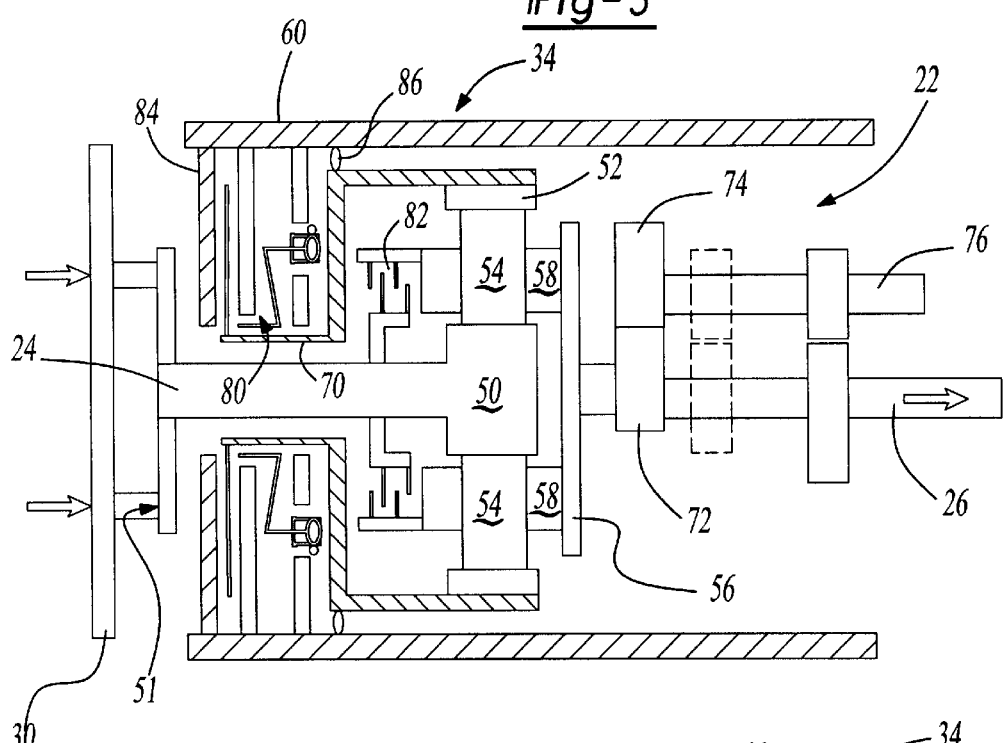
FIG. 3 illustrates a second embodiment of this invention.

FIG. 3 shows another example transmission arrangement where separate engaging members 80 and 82 are provided for achieving the different gear reduction ratios. In this arrangement, the engaging member 80 is a dry clutch. The extension 70 is modified compared to that shown in FIG. 2. Additionally, a housing portion 84 provides the ability to ground the ring gear 52 to the housing 60. Since the engaging member 80 is a dry clutch, an oil ring 86 preferably is provided to seal off the transmission lubricants from the dry clutch.

A dry clutch may be desired as an actuator in the planetary gear arrangement 34 because dry clutches tend to be more compact and provide a higher coefficient of friction compared to wet clutches.

The other engaging member 82 in the example illustrated in FIG. 3 is a wet clutch. The controller 40 preferably controls the engaging members 80 and 82 as needed to achieve the desired gear reduction ratio between the transmission input shaft 24 and the input gear member 72.

Figure 4:
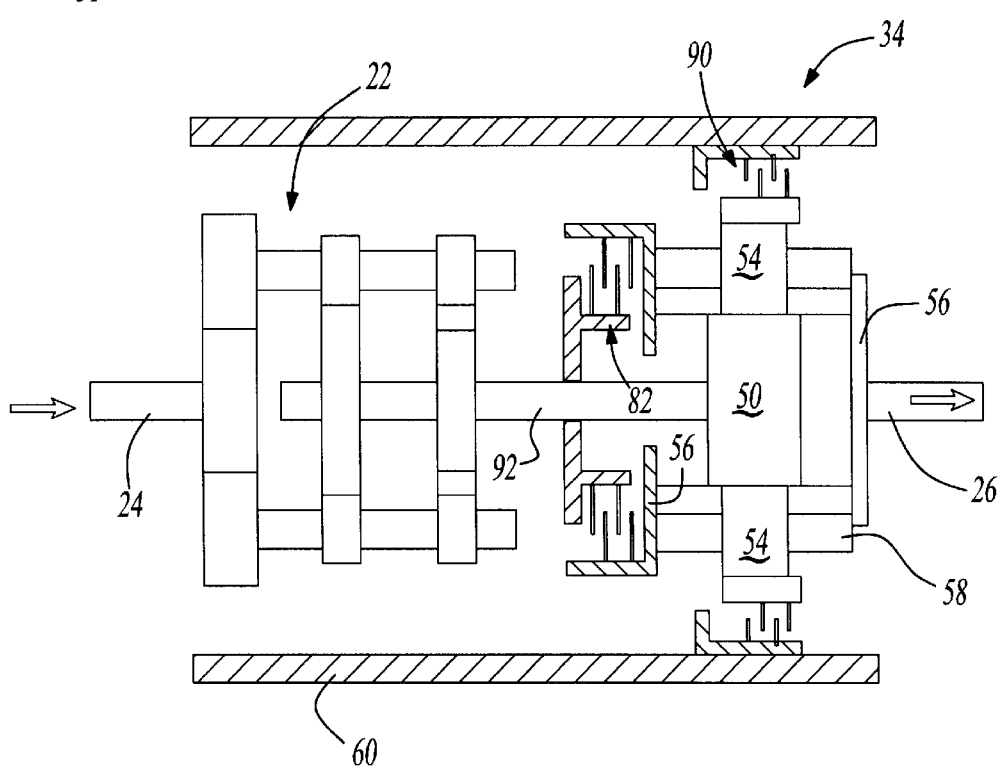
FIG. 4 illustrates a third embodiment of this invention.

FIG. 4 illustrates another embodiment of this invention. An engaging member 82, which is similar to that from FIG. 3 is utilized to lock the carrier member 56 to rotate with the sun gear 50. A separate engaging member 90 is selectively operated to ground the ring gear 52 to the housing 60. In this embodiment, the engaging members 82 and 90 preferably are wet clutches that are hydraulically activated through the controller 40.

A notable difference between the embodiment of FIG. 4 and those shown in FIGS. 2 and 3, for example, is that the planetary gear arrangement 34 is interposed between the transmission output shaft 26 the main gear box 22. In this embodiment, the engine output member 30 is directly coupled to the main gear box components. In this embodiment, the rotating shaft member 92 extends from the output of the main gear box 22 and is coupled directly with the sun gear 50. The planetary gear arrangement 34 then provides the selected gear reduction ratio between the shaft 92 and the output shaft 26 of the transmission system 20. In this embodiment, the carrier member 56 is coupled to rotate with the transmission output shaft 26.

Even though the planetary gear arrangement 34 is not interposed between the transmission input shaft 24 and the main gear box 22, it is still effective to perform the functions of a traditional clutch and range gear box in the same manner as the examples described above.

The main advantage to an arrangement as shown in FIG. 4 is that the main gear box 22 need not be redesigned. When the planetary gear arrangement 34 is in interposed between the transmission input shaft 24 and the main gear box 22 (as shown is FIGS. 2 and 3, for example) modification of the main gear box components typically is needed to accommodate the higher torque levels available with the first gear reduction ratio provided by the planetary gear arrangement 34. At the same time, however, placing the planetary gear arrangement 34 at the end of the transmission as shown in FIG. 4, typically requires larger planetary gear members. This type of arrangement currently is believed to be most suitable for use in medium duty vehicles. Heavy duty vehicle applications likely will benefit mostly from having the planetary gear arrangement 34 in the position illustrated in FIGS. 2 and 3, for example. Those skilled in the art who have the benefit of this description will have the ability to choose the arrangement and placement of the components that is best suited for a particular situation.

Figure 5:
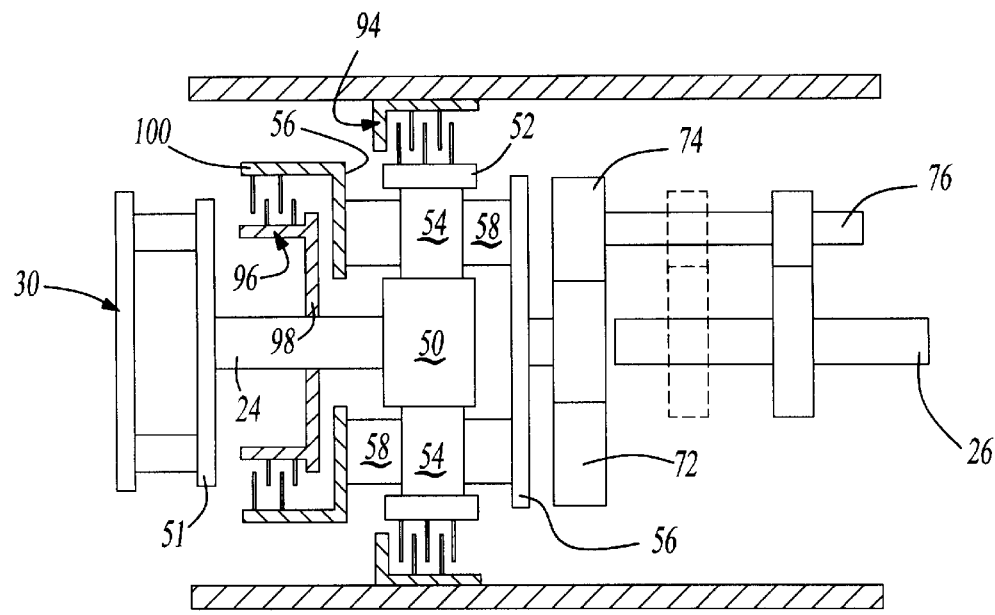
FIG. 5 illustrates a fourth embodiment of this invention.
Figure 6:
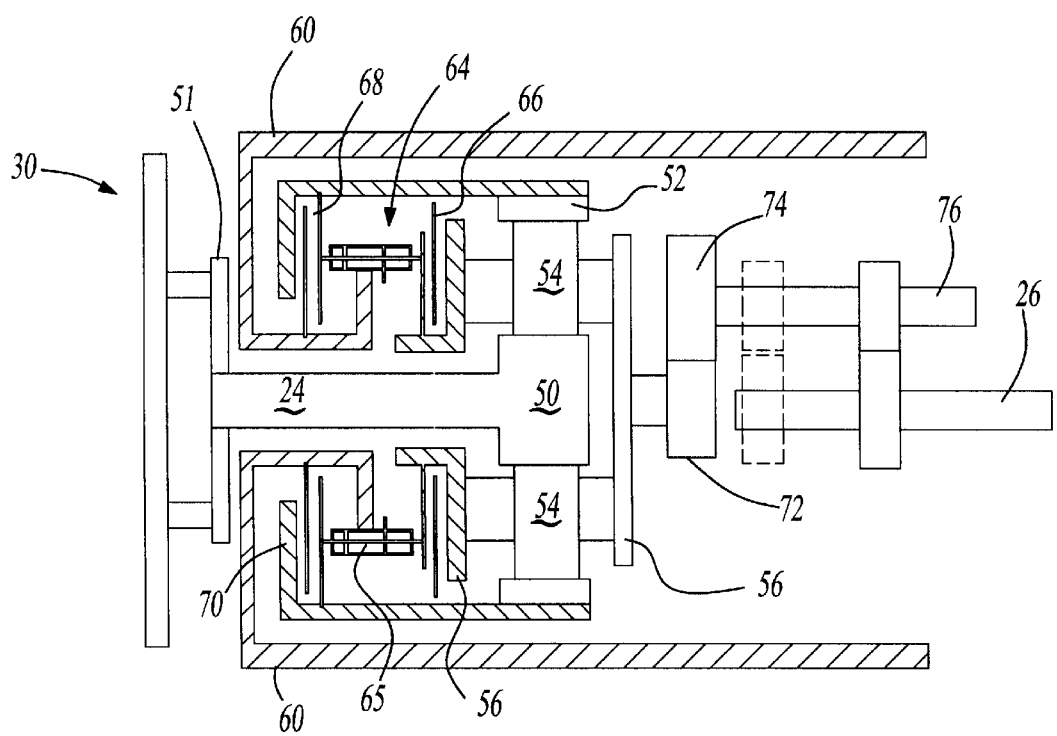
FIG. 6 illustrates a fifth embodiment of this invention.

FIG. 5 shows another embodiment where an engaging member 94 for grounding the ring gear 52 to the housing 60 is a wet clutch. The engaging member 94 is supported directly on the housing 60 and corresponding engaging components are supported on the ring gear 52, which eliminates the need for the extension 70 shown in other embodiments. An engaging member 96, which also preferably is a wet clutch, is used to lock the carrier member 56 to rotate with the ring gear 50 and the input shaft 24. The engaging member 96 is supported on a support member 98 and an extension 100 that is coupled with the carrier member 56. The operation of the arrangement of FIG. 5 is the same as that described with respect to FIG. 2, except for the difference in the positions and locations of the engaging members. FIG. 6 shows yet another example of a transmission system designed according to this invention. In this embodiment, the automated actuator 64 operates the clutch 68 to ground the ring gear 52 to the housing 60. The clutch 66 is utilized to lock the carrier member 56 to rotate with the ring gear 52 instead of with the sun gear 50 (as was done with the embodiment of FIG. 2). This embodiment has advantages compared to the embodiment of FIG. 2 in that the design and manufacture of the portions that support the clutch components of the clutches 66 and 68 are believed to be simpler to accomplish. Additionally, manufacturing the transmission with components arranged as schematically illustrated in FIG. 6 is believed to be more easily accomplished.

Figure 7:
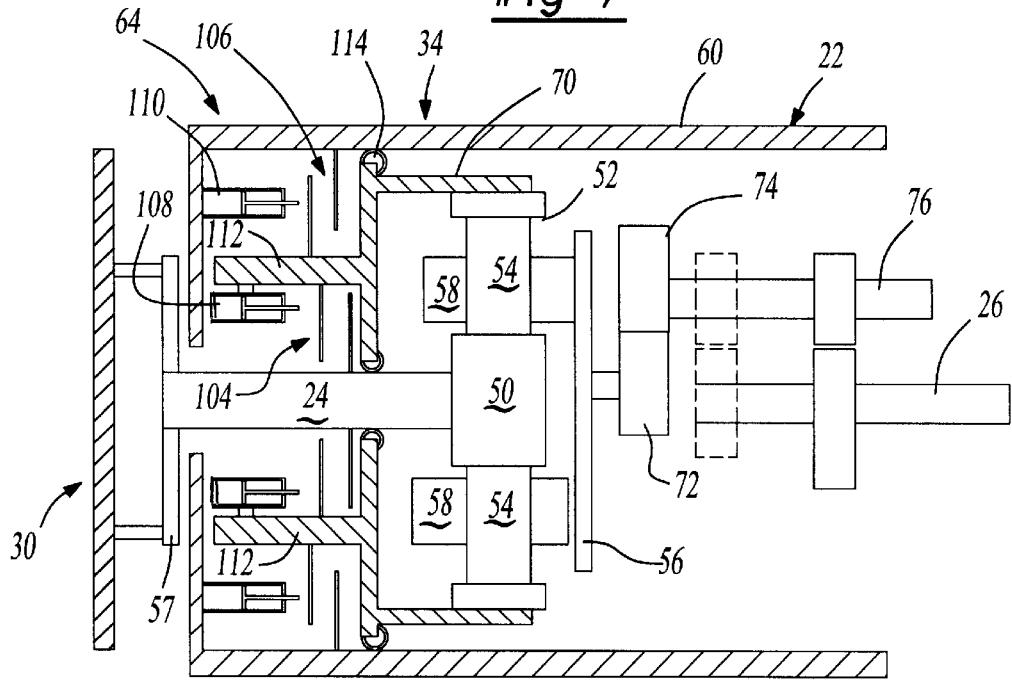
FIG. 7 illustrates a sixth embodiment of this invention.

FIG. 7 illustrates another embodiment where two dry clutches 104 and 106 serve as the engaging member. Independent actuator pistons 108 and 110 are controlled by the controller 40 to move the clutches 104 and 106 into and out of engaging positions, respectively. In this embodiment, a single support portion 112 supports at least one of the clutch plates of each of the clutches 104 and 106. The support portion 112 preferably is connected with the extension 70 from the ring gear 52. Selective activation of the actuators 108 and 110 either locks the ring gear 52 to the housing 60 or locks the carrier member 56 to rotate with the sun gear 50. Since dry clutches 104 and 106 are used, an oil seal 114 is provided to prevent transmission lubricants from contacting the clutch components.

Figure 8:
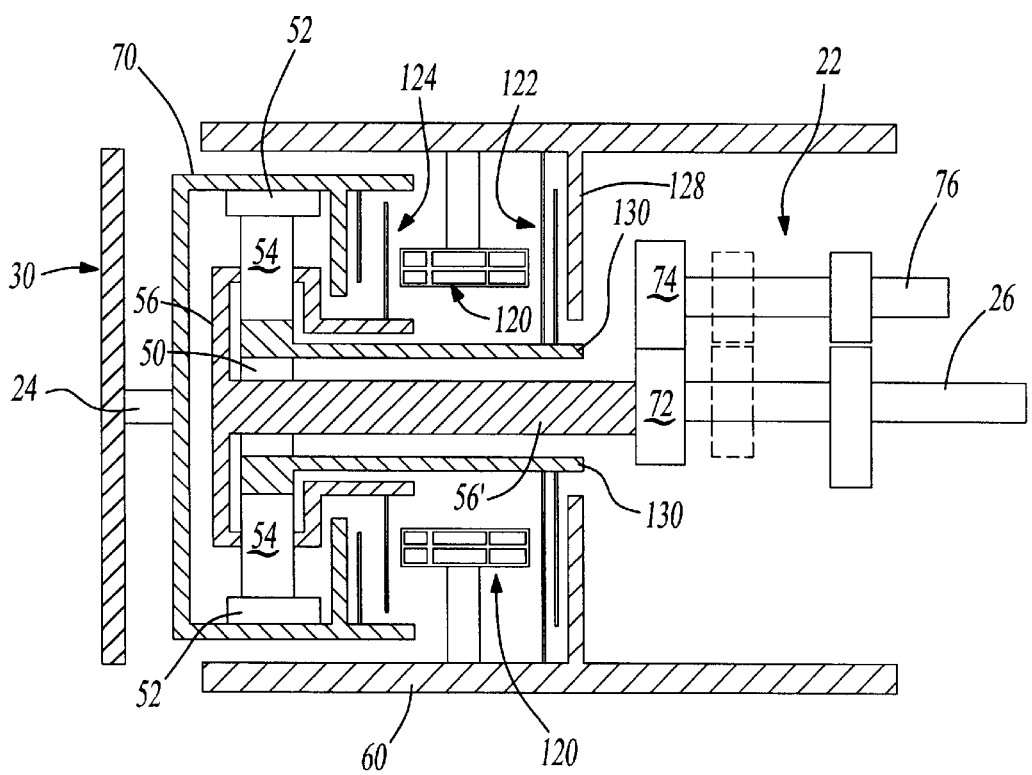
FIG. 8 illustrates a seventh embodiment of this invention.

FIG. 8 illustrates another example implementation of this invention. In this embodiment, the ring gear 52, rather than the sun gear 50, is the driving gear of the planetary gear arrangement 34. In this embodiment, the ring gear 52 and the transmission input shaft 24 are coupled to rotate together by the extension 70 from the ring gear 52. Coupling the ring gear 52 to the transmission input shaft 24 and, therefore, the engine output member 30, provides a different torque multiplication value at the first gear reduction ratio. In one example, the torque multiplication factor is approximately 1.5 (compared to 3 in the example arrangement of FIG. 2).

In this embodiment, an actuator 120 operates clutches 122 and 124 respectively. The actuator 120 preferably includes a moving piston as described above with respect to FIG. 2. The clutch 122 is engaged to ground the sun gear 50 to the housing 60. The clutch 122 cooperates with an extension 128 from the housing 60 and an extension 130 on the sun gear 50. When the sun gear 50 is grounded to the housing 60, the carrier member 56 and the pinion gears 54 rotate with the ring gear 52. A carrier extension 56 is coupled to the main gear box input gear 72 so that driving torque is provided to the main gear box and through the transmission output shaft 26 to the wheels of the vehicle.

The clutches 122 and 124 are both disengaged whenever it is desirable to place the transmission into neutral or to shift gears.

The clutch 124 is engaged to lock the carrier member 56 to rotate in unison with the ring gear 52. In this position, the planetary gear arrangement 34 provides a direct drive coupling between the engine output member 30 and the transmission main box input gear 72. This provides a high range of gear ratios.

Given this description, those skilled in the art will realize that a variety of variations in components, arrangement and coordination are possible. For example, the planetary gear arrangement 32 can be placed in "front" of the main gear box 22 or at the "rear" of the main gear box 22. Additionally, the carrier member 56 can be locked to rotate with the sun gear 50 or the ring gear 52, depending on which of those is directly coupled to rotate with the engine output member 30. Additionally, the ring gear 52 and sun gear 50 can be locked to rotate in unison to achieve the high range of gear ratios.

The preceding description provides example transmission systems designed according to this invention. Variations and modifications may become apparent to those skilled in the art that do not necessarily depart from the basis of this invention. The scope of legal protection given to this invention can only be determined by studying the following claims.

What is claimed is:

1. A vehicle transmission system, comprising:

an engine having a rotating output member;

an input shaft directly coupled to always rotate with the engine output member;

an output shaft;

a main gear box having a plurality of main gear members that are selectively engaged to provide a plurality of gear ratios between the input shaft and the output shaft;

a shift member that is useable by a driver of the vehicle to manually select one of the plurality of gear ratios, manipulation of the shift member generating an electrical signal indicative of a desired gear ratio;

an automated mover that moves the gear members into a position corresponding to the desired gear ratio responsive to the generated electrical signal;

a planetary gear arrangement that is selectively operated to couple the transmission input shaft to the output shaft such that the force from the engine output member is selectively transferred through the planetary gear arrangement and the main gear members to the output shaft;

a single housing containing the main gear box and the planetary gear arrangement; and an automated actuator that moves the planetary gear arrangement into a first operative position where the input shaft is coupled to the output shaft with a first gear reduction ratio, a second operative position where the input shaft is coupled to the output shaft with a second gear reduction ratio and a third operative position where no torque is transmitted from the input shaft to the output shaft.

2. The system of claim 1, wherein the shift member is a manual stick shift that is manually operated by a vehicle driver to manually move the main gear members into a selected gear ratio.

3. The system of claim 1, wherein the planetary gear arrangement includes a sun gear, a ring gear, a plurality of pinion gears between the sun gear and the ring gear, and a carrier member that is coupled to the pinion gears and wherein one of the sun gear or the ring gear is coupled to the transmission input shaft to rotate with the input shaft and the other of the sun gear or the ring gear is selectively allowed to rotate with the one gear or locked against rotation with the one gear.

4. The system of claim 1, wherein the planetary gear arrangement includes a first gear member fixed to rotate with the input shaft, a second gear member that generally surrounds the first gear member, a plurality of intermediate pinion gear members between and engaging the first and second gear members, and a carrier member that is associated with the pinion gear members.

5. The system of claim 1, including a controller that determines when a driver intends to change the main gear box from a current gear ratio to a desired gear ratio and the controller controls the automated actuator to move the planetary gear arrangement into the third operative position so that the current gear ratio in the main gear box can be disengaged and the desired gear ratio in the main gear box can be engaged.

6. The system of claim 1, wherein the automated actuator includes an engaging device that moves into a first engaging position to place the planetary gear arrangement into the first operative position, a second engaging position to place the planetary gear arrangement into the second operative position and a third engaging position between the first and second positions to move the planetary gear arrangement into the third operative position.

7. The system of claim 3, wherein the carrier member is coupled with the main gear members and wherein the carrier member rotates with the one gear to provide a first gear reduction ratio when the other gear is allowed to rotate with the one gear and the carrier member rotates with the one gear to provide a second gear reduction ratio when the other gear is locked against rotation with the one gear.

8. The system of claim 7, wherein the sun gear is fixed to rotate with the input shaft.

9. The system of claim 7, including a transmission housing and wherein the other gear is locked against rotation by being selectively coupled to the housing.

10. The system of claim 7, including an automated actuator that selectively locks the other gear against rotation with the one gear.

11. The system of claim 10, wherein the automated actuator selectively couples the carrier member to the one gear when the other gear is allowed to rotate with the one gear such that the carrier member rotates at the same speed as the input shaft.

12. The system of claim 4, including an automated actuator that selectively locks the second gear against rotation with the first gear member and that selectively couples the carrier member to the first gear member.

13. A vehicle transmission system, comprising:
an engine having a rotating output member;
a transmission input member directly coupled to always rotate with the engine output member;
a transmission output shaft;
a main gear box having a plurality of gear members that are selectively engaged to provide a plurality of gear ratios;
an automated actuator that is positioned between the main gear box and the transmission output shaft and that selectively couples the transmission input member with the transmission output shaft such that a first gear reduction ratio is provided in a first range, the automated actuator selectively coupling the transmission input member with the output shaft such that a second gear reduction ratio is provided in a second range, the automated actuator selectively uncoupling the transmission input member from the transmission output shaft such that no driving torque is transmitted between the transmission input member and the transmission output shaft; and
a manual shift member that is manually moveable by a driver to select a desired gear ratio within the main gear box.

14. The system of claim 13, including an electronic controller that detects movement of the shift member indicating a desire to shift gear ratios within the main gear box and responsively controls the automated actuator to uncouple the transmission input member from the transmission output shaft such that a currently engaged gear ratio within the main gear box can be disengaged.

15. The system of claim 14, wherein the automated actuator comprises a planetary gear assembly that is controlled by the electronic controller to move into a first operating position where the planetary gear assembly provides the first gear reduction ratio, a second operating position where the planetary gear assembly provides the second gear reduction ratio and a third operating position where the planetary gear assembly uncouples the transmission input member from the transmission output shaft.

16. The system of claim 6, wherein the engaging device includes a piston member that moves in opposite directions to move into the first and second engaging positions, respectively.

17. A vehicle transmission system, comprising:
an engine having a rotating output member;
an input shaft directly coupled to always rotate with the engine output member;
an output shaft;
a main gear box having a plurality of main gear members that are selectively engaged to provide a plurality of gear ratios between the input shaft and the output shaft;
a shift member that is useable by a driver of the vehicle to manually select one of the plurality of gear ratios;
a planetary gear arrangement that is selectively operated to couple the transmission input shaft to the output shaft such that the force from the engine output member is selectively transferred through the planetary gear arrangement and the main gear members to the output shaft;
an automated actuator including a single moving piston member that moves in a first direction to place the planetary gear arrangement into a first operative condition where the input shaft is coupled to the output shaft with a first gear reduction ratio, the moving piston member moving in a second direction to place the planetary gear arrangement into a second operative condition where the input shaft is coupled to the output shaft with a second gear reduction ratio and the piston member moving into a nonengaging position such that the planetary gear arrangement is in a third operative condition where no torque is transmitted from the input shaft to the output shaft; and
an electronic controller that detects movement of the shift member indicating a desire to shift gear ratios within the main gear box and responsively controls the automated actuator to uncouple the transmission input member from the transmission output shaft such that a currently engaged gear ratio within the main gear box can be disengaged.

18. The system of claim 17, including a single housing that contains the main gear box and the planetary gear arrangement.

19. The system of claim 17, wherein the first direction that the piston member moves is opposite from the second direction and the nonengaging position is an intermediate position between engaging positions corresponding to the first operative condition and the second operative condition.

* * * * *

UNITED STATES PATENT AND TRADEMARK OFFICE
CERTIFICATE OF CORRECTION

PATENT NO. : 6,406,400 B1
DATED : June 18, 2002
INVENTOR(S) : Shan Shih, Troy

It is certified that error appears in the above-identified patent and that said Letters Patent is hereby corrected as shown below:

<u>Title page,</u>
Item [73], Assignee: replace

"Meritor Heavy Vehicle Systems, LLC,
Troy, MI (US)"

with --

ZF Meritor, LLC
Maxton, NC (US) --

Signed and Sealed this

Twenty-first Day of January, 2003

JAMES E. ROGAN
*Director of the United States Patent and Trademark Office*